No. 694,539. Patented Mar. 4, 1902.
J. ENGLAND & M. HUTCHINSON.
SEAT POST FOR BICYCLES.
(Application filed Nov. 18, 1899. Renewed Jan. 16, 1902.)
(No Model.) 2 Sheets—Sheet 1.
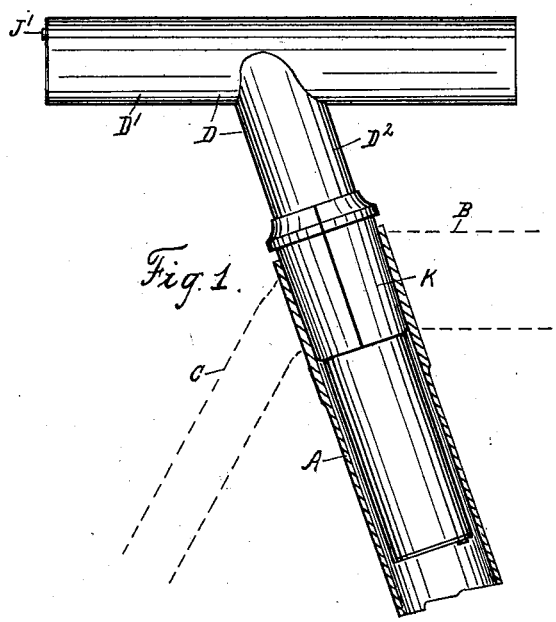
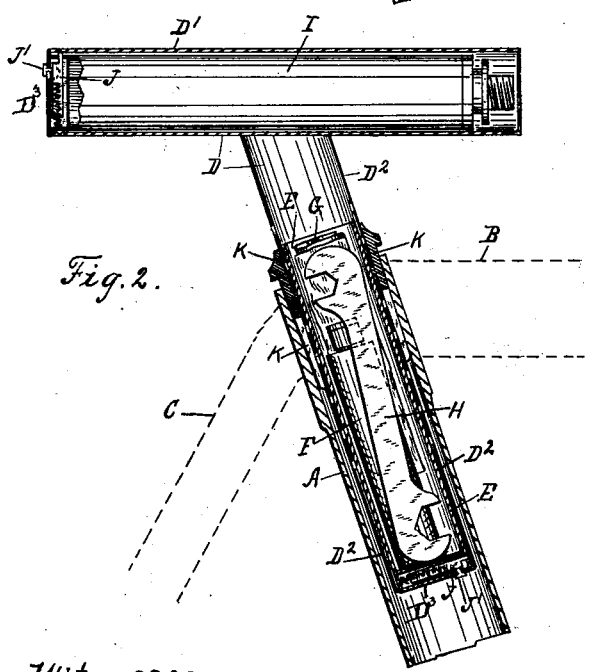
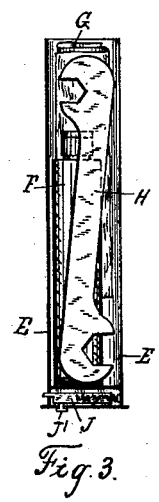
Witnesses
P. Edmunds
A. Edmunds
Inventors
John England. Moses Hutchinson
By P. J. Edmunds
Attorney No. 694,539. Patented Mar. 4, 1902.
J. ENGLAND & M. HUTCHINSON.
SEAT POST FOR BICYCLES.
(Application filed Nov. 18, 1899. Renewed Jan. 16, 1902.)

(No Model.) 2 Sheets—Sheet 2.

Witnesses
D. Edmunds
M. Braund

Inventors
John England
Moses Hutchinson
By P. J. Edmunds
Attorney

UNITED STATES PATENT OFFICE.

JOHN ENGLAND, OF LONDON TOWNSHIP, AND MOSES HUTCHINSON, OF LONDON, CANADA.

SEAT-POST FOR BICYCLES.

SPECIFICATION forming part of Letters Patent No. 694,539, dated March 4, 1902.

Application filed November 18, 1899. Renewed January 16, 1902. Serial No. 90,055. (No model.)

*To all whom it may concern:*

Be it known that we, JOHN ENGLAND, a resident of London township, and MOSES HUTCHINSON, a resident of the city of London, in the county of Middlesex, in the Province of Ontario, Canada, subjects of the Queen of Great Britain, have jointly invented a certain new and useful Improvement in Seat-Posts for Bicycles, of which the following specification, taken in connection with the accompanying drawings, forms a full, clear, and exact description.

This invention relates to an improvement in seat-posts for bicycles whereby they may be adapted to be used as a carrier or receptacle for the bicycle air-pump, repairing material or tools, or other merchandise, parcels, or articles, the object being to so construct the vertical or horizontal portions of a bicycle seat-post and a receptacle contained therein that the latter may be readily, easily, and instantly removed from or secured in place in the former; and this invention consists in the novel construction and combination of parts, as will be hereinafter first fully set forth and described and then pointed out in the claims, reference being had to the accompanying drawings, wherein—

Figure 4:
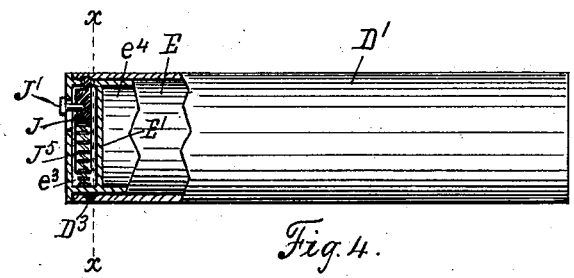
Figure 5:
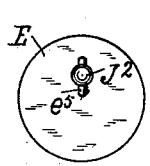
Figure 6:
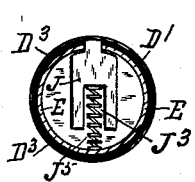
Figure 7:
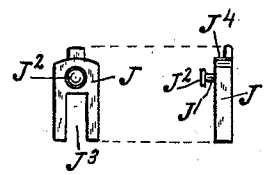
Figure 8:
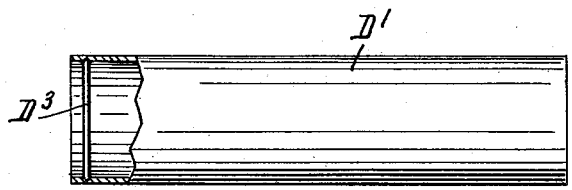
Figure 9:
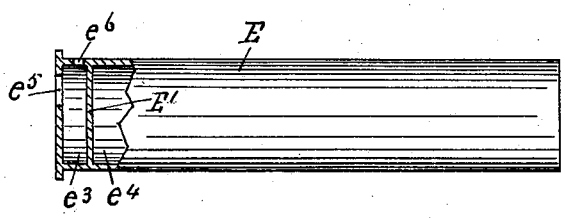

Figure 1 is a side elevation of a seat-post embodying our invention. In this view the seat-post mast is shown in section and the adjacent parts of the bicycle-frame in dotted lines. Fig. 2 is a central sectional view of same. Fig. 3 is a detail central sectional view of a receptacle containing a bicycle repair outfit and wrench. Fig. 4 is an enlarged detail side view of the horizontal portion of the seat-post, a portion of one end of which as well as the receptacle and securing devices contained therein are shown in section. Fig. 5 is an end view of Fig. 4. Fig. 6 is a cross-sectional view on the line $x\ x$ of Fig. 4. Fig. 7 is a detail front and side view of the spring-bolt. Fig. 8 is a detail side view of the horizontal portion of the seat-post, partly in section. Fig. 9 is a detail side view of the receptacle, partly in section.

In the accompanying drawings, A designates the seat-post mast, B the top bar, and C the back stays of a bicycle-frame.

D designates the seat-post, consisting of the horizontal portion $D'$ and the upright portion $D^2$. $D^3$ designates a groove or recess formed in the internal face of each of said portions $D'$ and $D^2$, as shown particularly in Fig. 8.

E designates a receptacle, and $E'$ a partition therein, which divides said receptacle into two chambers $e^3$ and $e^4$, and $e^5$ is an elongated slot in the end of, and $e^6$ an opening in the side of, said receptacle.

F designates the cement, G the repairing material, and H a wrench contained in one receptacle, and I an air-pump contained in the other receptacle.

J designates a spring-bolt, which is located in the chamber $e^3$ of the receptacle E, the reduced outer end of which bolt J extends through the opening $e^6$ in the side of said receptacle, and $J'$ is a pin which extends through the elongated slot $e^5$ in the end of said receptacle, and its inner end is rigidly secured in the spring-bolt J, and $J^3$ is a socket formed in, and $J^4$ a shoulder formed on, said spring-bolt.

$J^5$ designates a coil-spring located in the chamber $e^3$ of the receptacle E, between the spring-bolt J and the inner face of said receptacle, and said spring $J^5$ is held in line as said spring-bolt is moved back and forth by being located in the socket $J^3$ in said spring-bolt.

When the various parts are placed in position, as shown in Figs. 4 and 6, the outer end of the spring-bolt J is held by the spring $J^5$ in the groove or recess $D^3$ in either the horizontal or vertical portion of the seat-post D to safely and securely hold said receptacle, as well as the articles contained therein, in said seat-post. Again, by pressing on the enlarged head $J^2$ of the pin $J'$ and moving the latter toward the center of the receptacle E the spring-bolt J will be moved in the same direction. This will withdraw the end of said spring-bolt J from the groove or recess $D^3$ in the horizontal or vertical portion of the seat-post and compress the spring $J^5$. This will permit the receptacle E to be readily, easily, and instantly removed from the seat-post in order to get access to the instruments in said receptacle E, and when through with said instruments by replacing them in said receptacle E and inserting the end of the latter in the hollow portion of the seat-post and pressing on the enlarged head $J^2$ of the pin $J'$, as just described, the end of the spring-bolt J will be moved into the chamber $e^3$ of the receptacle E and the spring $J^5$ compressed, so that when the receptacle E has been adjusted to the position shown in Fig. 4 by releasing the head of the pin $J'$ from pressure the spring $J^5$ will expand and move the end of the spring-bolt J into the groove or recess $D^3$ in the seat-post D.

The advantages of this invention are that the automatic locking devices being located in the end of the receptacle and seat-post very little room is occupied by them. Therefore the full capacity of the receptacle may be utilized; and, again, the partition in the end of the receptacle prevents the instruments or other articles contained therein from interfering with the free working of the automatic fastening devices. Again, the whole is concealed within the seat-post and carried by the bicycle, and a simple, strong, durable, and inexpensive device for the purposes described is provided.

Having thus described our invention, we claim—

In a device of the character described, a receptacle, in the side and end of which an opening and elongated slot respectively are formed, a partition in said receptacle for dividing it into two chambers, a spring-bolt formed with a shoulder and in which a socket is formed, one end of which spring-bolt projects through the side opening in said receptacle, a coil-spring in said receptacle located between said spring-bolt and the adjacent face of said receptacle, a pin secured to said spring-bolt and extending through the elongated slot in the end of said receptacle, in combination with a bicycle seat-post, in the interior face of which a circumferential groove is formed, with which the end of the spring-bolt engages, substantially as and for the purpose set forth.

In testimony whereof we have signed in the presence of the two undersigned witnesses.

JOHN ENGLAND.
MOSES HUTCHINSON.

Witnesses:
P. J. EDMUNDS,
EDMUND WELD.